United States Patent
Yasuda

(10) Patent No.: US 7,525,703 B2
(45) Date of Patent: Apr. 28, 2009

(54) METHOD, APPARATUS AND COMPUTER PRODUCT PROGRAM FOR PERFORMING SHADING CORRECTION OF IMAGE PROCESSING APPARATUS

(75) Inventor: Naohiro Yasuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1622 days.

(21) Appl. No.: 10/007,279

(22) Filed: Nov. 12, 2001

(65) Prior Publication Data

US 2002/0089707 A1 Jul. 11, 2002

(30) Foreign Application Priority Data

Nov. 15, 2000 (JP) ............................. 2000-347726

(51) Int. Cl.
*G03F 3/08* (2006.01)
(52) U.S. Cl. .................. 358/521; 358/461; 358/465; 358/466; 358/504; 358/505; 358/516; 358/530; 358/2.1; 382/270; 382/273; 382/274
(58) Field of Classification Search ............... 358/521, 358/2.1, 504, 505, 516, 530, 461, 465, 466; 382/270, 273, 274
See application file for complete search history.

(56) References Cited

U.S. PATENT DOCUMENTS

| 4,691,365 | A | * | 9/1987 | Nagashima | 382/274 |
| 5,414,522 | A | * | 5/1995 | Moriya | 358/296 |
| 5,640,467 | A | * | 6/1997 | Yamashita et al. | 382/181 |
| 6,243,500 | B1 | * | 6/2001 | Kawamoto | 382/275 |
| 6,694,051 | B1 | * | 2/2004 | Yamazoe et al. | 382/167 |
| 6,707,951 | B1 | * | 3/2004 | Suzuki et al. | 382/260 |

FOREIGN PATENT DOCUMENTS

| JP | 6-6589 | | 1/1994 |
| JP | 9-135332 | | 5/1997 |
| JP | 10-233925 | * | 9/1998 |
| JP | 11-122490 | * | 4/1999 |
| JP | 11122490 | | 4/1999 |

* cited by examiner

*Primary Examiner*—Twyler L. Haskins
*Assistant Examiner*—Michael Burleson
(74) *Attorney, Agent, or Firm*—Cooper & Dunham, LLP

(57) ABSTRACT

An image reading apparatus includes an abnormal pixel detection device configured to examine a value of standard white image data, which is acquired by reading a white image to be a standard for a shading correction, on a pixel-by-pixel basis, to determine whether or not pixels are abnormal, wherein a previously specified value is stored for use as the standard white image data for pixels which are determined to be abnormal by the abnormal pixel detection device. As a result, costs of the image reading apparatus can be reduced because a special memory device for memorizing the positions of abnormal pixels is not required.

25 Claims, 12 Drawing Sheets

METHOD, APPARATUS AND COMPUTER PRODUCT PROGRAM FOR PERFORMING SHADING CORRECTION OF IMAGE PROCESSING APPARATUS

BACKGROUND

1. Field

This patent specification relates to a method, an apparatus and a computer program product for performing a shading correction of an image processing apparatus, and more particularly adjusting shading correction data for an abnormal pixel using a predetermined value to perform an appropriate shading correction.

2. Discussion of the Background

Generally, an image reading apparatus includes an image sensor, such as a CCD, and an analog/digital converter to convert optical information obtained by optically scanning an original document into an electric signal using the image sensor. The electric signal is then converted into multivalued image data by the analog/digital converters.

In such an image reading apparatus, the conversion process to the image data is controlled according to a contrast of an original document and a luminance change in a light source. Because an output from the image sensor is especially important, a shading correction is performed to correct a sensitivity of the image sensor.

A white plate is used for a shading correction. A standard value for the shading correction is set based on a result of reading the white plate.

Therefore, if the white plate is dirty, a standard value may not be correct. Thus, improper shading correction may be performed resulting in output of degraded image data. Further, if fouling adheres to a platen which contacts a reading surface of an original document or to a component in a light path, such as a lens, or when the image sensor is defective, degraded image data can be output, which is different from the output when the white plate is dirty because not only standard shading correction data but also read image data are affected. Such a degradation of image data caused by the above-described fouling cannot be removed by a shading correction.

Japanese Patent Laid-Open Publication No. 11-122490 discusses a technology for handling degradation caused by dirt or fouling to improve a reading performance of an image reading apparatus.

According to Japanese Patent Laid-Open Publication No. 11-122490, the image reading apparatus, in which a shading correction on image data of an original document is performed using shading correction data obtained by reading the white plate, includes an abnormal pixel detection section which detects an abnormal pixel in the image data obtained by reading the white plate. The apparatus also includes a diagnose section to determine whether or not the abnormal pixel detected by the abnormal pixel detection section is caused by dirt on the white plate.

The apparatus further includes an abnormal pixel correction section to correct shading correction data obtained at a position where an abnormal pixel is detected when the detected abnormal pixel is caused by dirt of the white plate. The abnormal pixel correction section corrects the shading correction data by using data of a pixel around the abnormal pixel when the detected abnormal pixel is caused by factors other than dirt on the white plate.

A memory device is required to store information about a position of an abnormal pixel to identify the abnormal pixel in the shading correction data in the image reading apparatus discussed in Japanese Patent Laid-Open Publication No. 11-122490. Standard shading data or image data must be corrected based on information on the position of the abnormal pixel.

For example, a special memory device may be employed to store a result of the determination made by the abnormal pixel determination section so as to store information about the position of the abnormal pixel.

However, an abnormal pixel may be very rarely detected when the apparatus is used in a normal condition, and entropy may be very small from an information engineering standpoint. Nevertheless, it increases in costs to provide a special memory device to store image information for such corrections in order to form a high-quality image.

SUMMARY

The disclosure herein takes into account and addresses the above-discussed and other problems, and describes a novel image reading apparatus that can provide a high-quality image at a reduced cost.

According to an example of a preferred embodiment, an image reading apparatus includes an image sensor configured to read an image of an original document, a shading correction device configured to perform a shading correction on read image data, and an abnormal white image pixel detection device configured to examine a value of standard white image data on a pixel-by-pixel basis to determine whether or not a pixel is abnormal, wherein the standard white image data is acquired by reading a white image which is a standard for a shading correction.

BRIEF DESCRIPTION OF THE DRAWINGS

A more complete appreciation of the disclosure and many of the attendant to advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
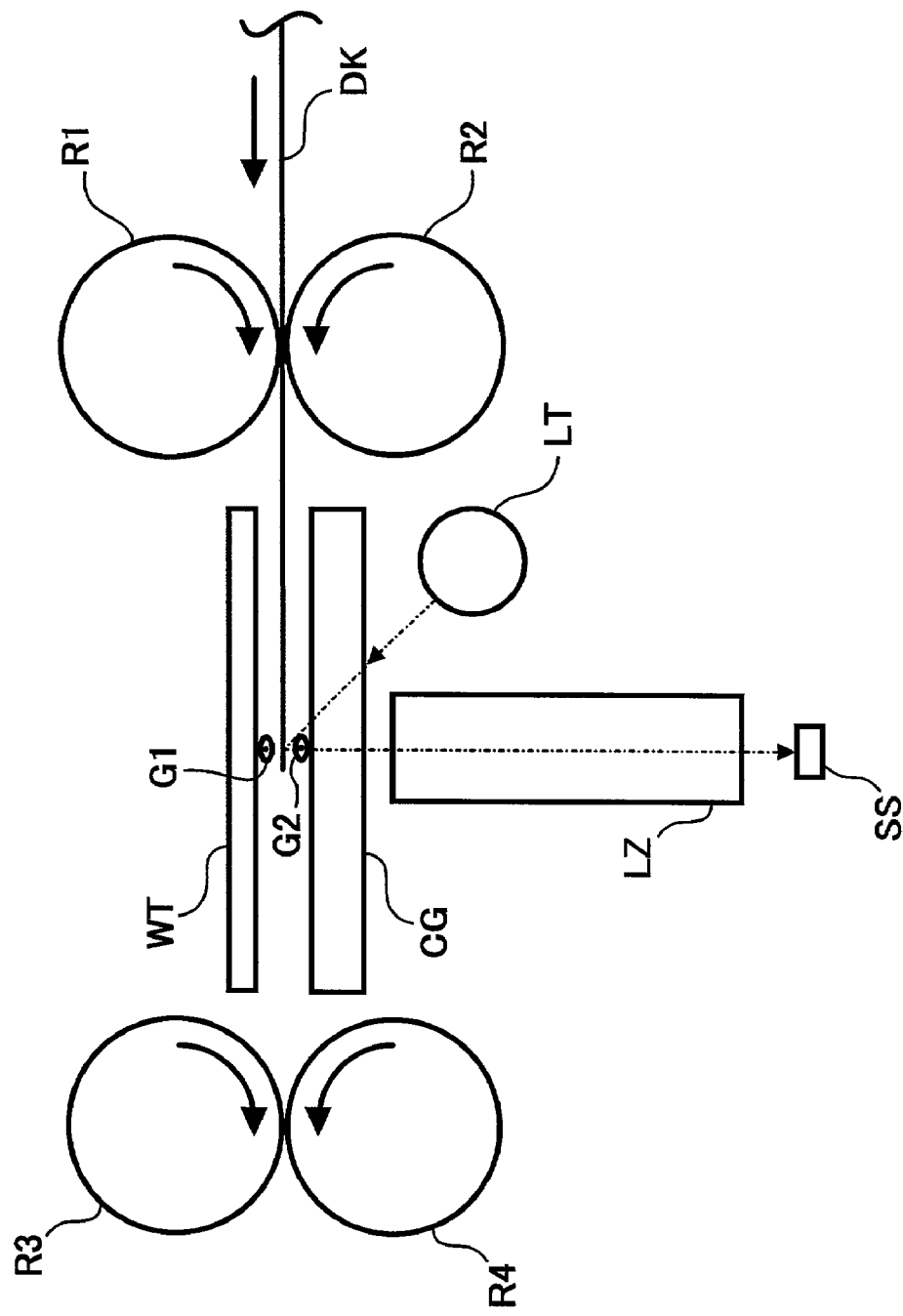
FIG. 1 is a schematic drawing illustrating a construction of an original document feeding system and an optical system of an image reading apparatus according to an example of a preferred embodiment.

Referring now to the drawings, wherein like reference numerals designate identical or corresponding parts throughout the several views, FIG. 1 is a schematic drawing illustrating a construction of an original document feeding system and an optical system of an image reading apparatus according to an example of a preferred embodiment.

An original document DK is fed toward a reading position while being sandwiched by a pair of sheet feeding rollers R1 and R2. The original document DK is then conveyed between a platen CG and a white plate WT to a pair of sheet discharging rollers R3 and R4 which are arranged at the opposite side of the apparatus. Then, the original document DK is discharged by the pair of the discharging rollers R3 and R4.

The original document DK is irradiated with a beam of light emitted from a laser light source LT. The light reflected from the original document DK is led to a lens LZ to form an image on a line image sensor SS.

Fouling G1 adheres to a surface of the white plate WT. The fouling G1 does not affect a read image because the fouling G1 is hidden by the original document when an image of the original document DK is read.

However, as described below, the fouling G1 affects the reading of the white plate WT to form a standard white image to be used in a shading correction operation.

Fouling G2 on platen CG affects a read image both when the original document DK is read and when the standard white image for the shading correction is formed, because the fouling G2 is in a light path from the linear light source LT, through a reading position of the original document DK, the lens LZ, to the line image sensor SS.

Thus, there are two types of fouling which adhere to an optical system. A first type of fouling causes abnormal pixels (pixel values) when forming a standard white image for a shading correction but does not cause abnormal pixels when reading the original document DK. A second type of fouling causes abnormal pixels both when forming the standard white image for the shading correction and when reading the original documents DK.

Figure 2:
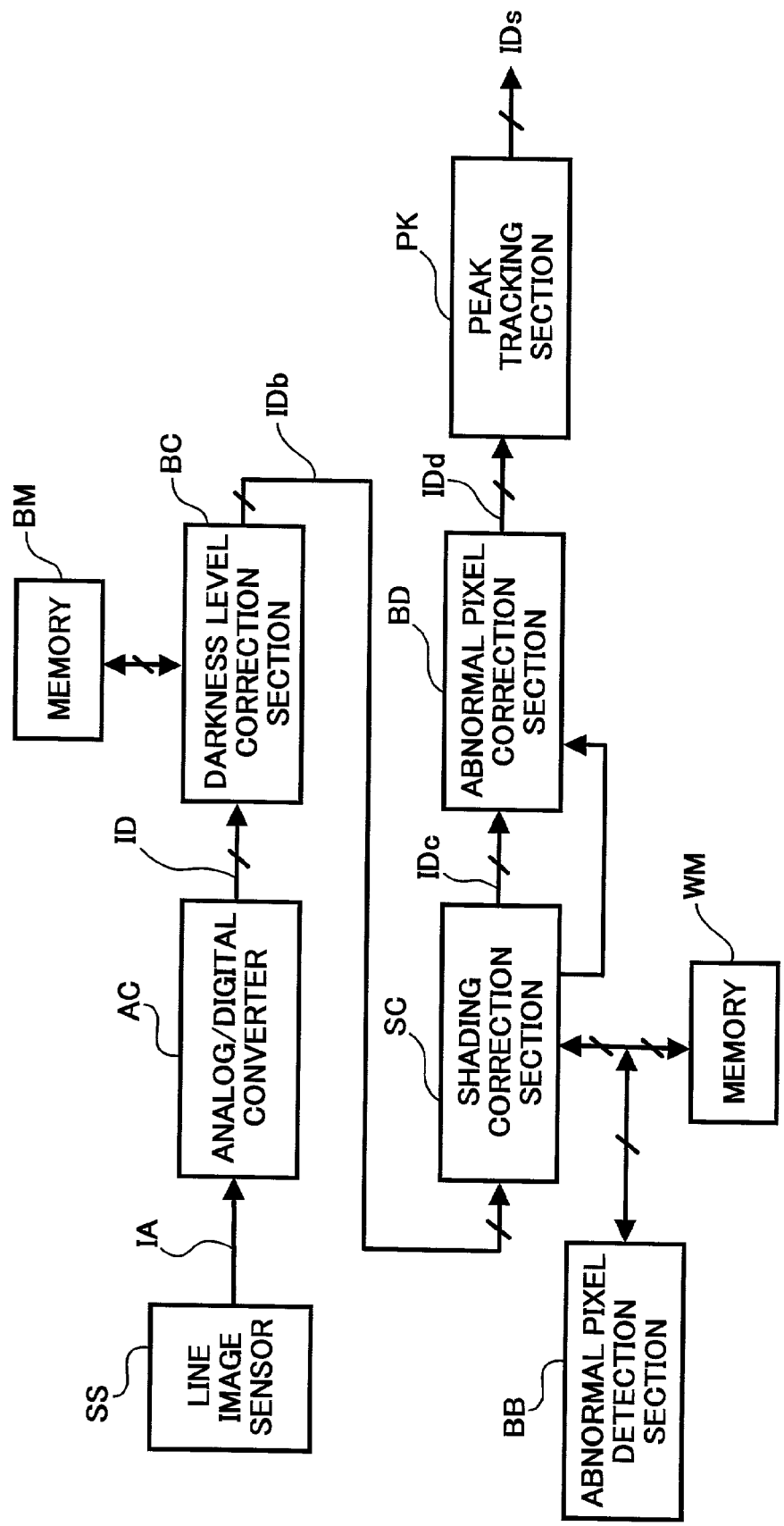
FIG. 2 is a block diagram illustrating a processing system of image data of the image reading apparatus.

FIG. 2 is a block diagram illustrating a processing system of image data of an image reading apparatus according to an example of a preferred embodiment.

Figure 4:
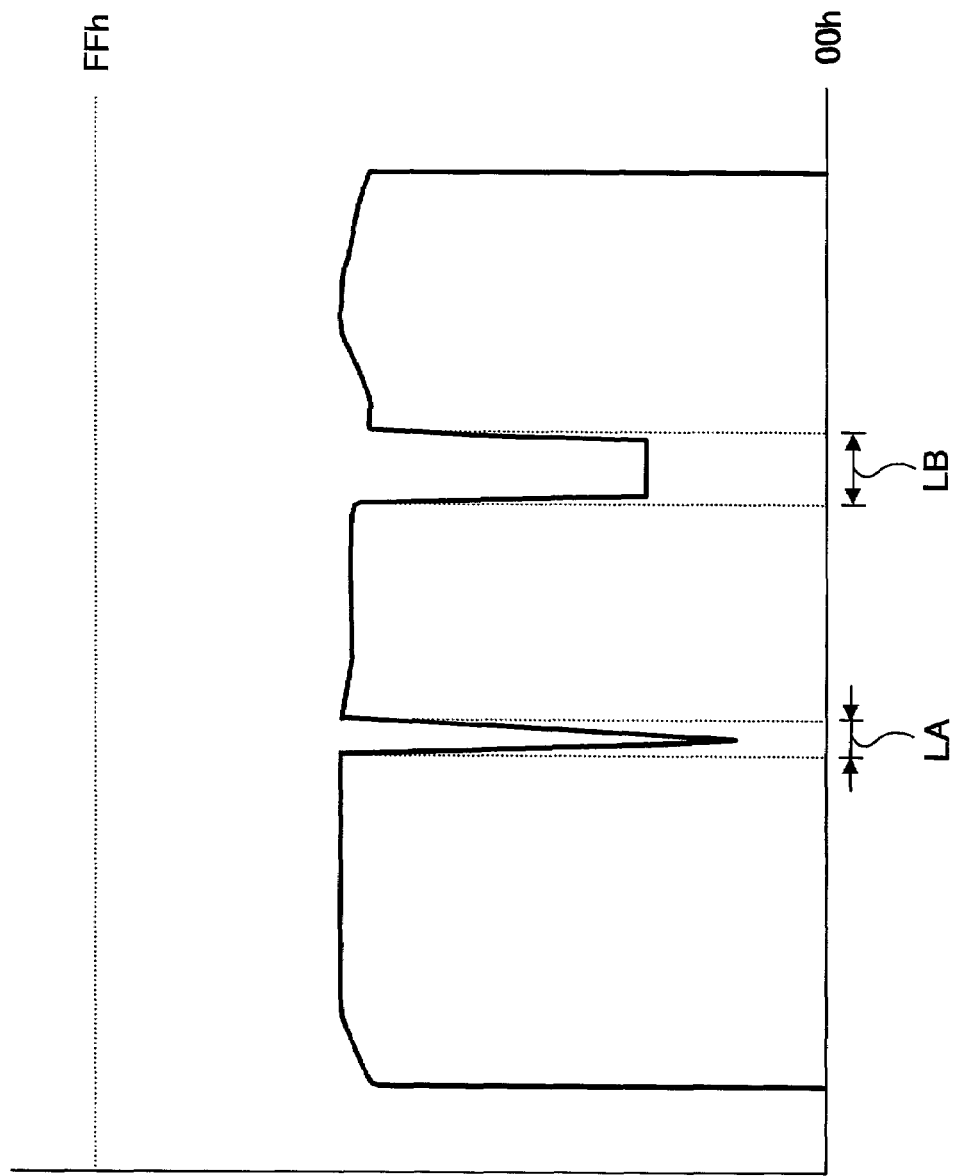
FIG. 4 is a diagram illustrating an example of standard shading data before a correction is performed.
Figure 5:
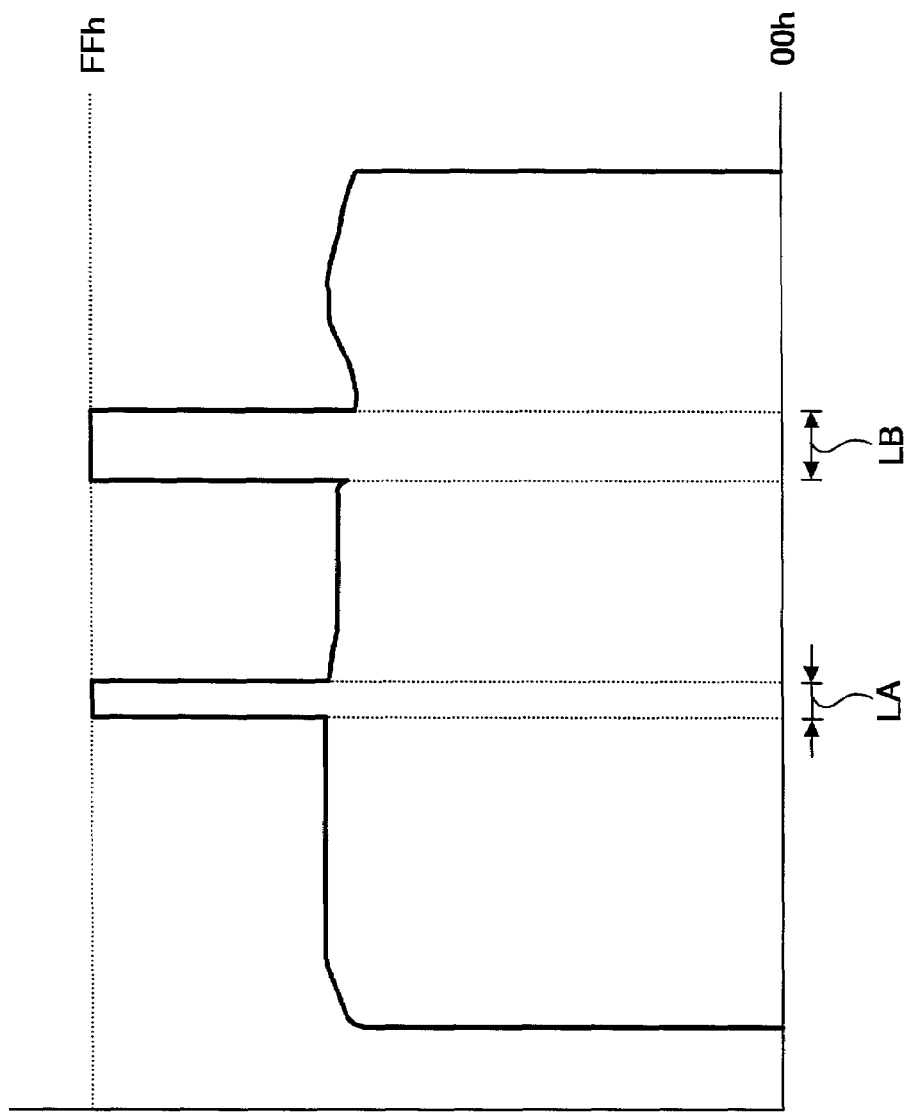
FIG. 5 is a diagram illustrating an example of standard shading data after a correction is performed.

Before describing the system of FIG. 2 in detail, a qualitative description is given of the examples illustrated in FIGS. 4-10. FIG. 4 illustrates results of scanning a white plate with fouling at locations LA and LB that reduce light reflection and decrease the measured white image pixel values. This fouling can be the G1 type shown in FIG. 1 (behind the document DK), or type G2 (between the light source and the document), or both. FIG. 5 illustrates one way of correcting the white image data at the abnormal portions caused by the fouling—set the abnormal pixel values to a maximum such as FFh (alternatively, to a minimum such as OOh, not illustrated). FIG. 5 illustrates another way of correcting the white image data at the abnormal region LB, useful when region LB is too large in size (exceeds a certain number of pixels)—set the values of the pixels in region LB to some value lower is than normal white data, such as 0.9 times nearby normal pixel values or some other measure of normal values.

Figure 6:
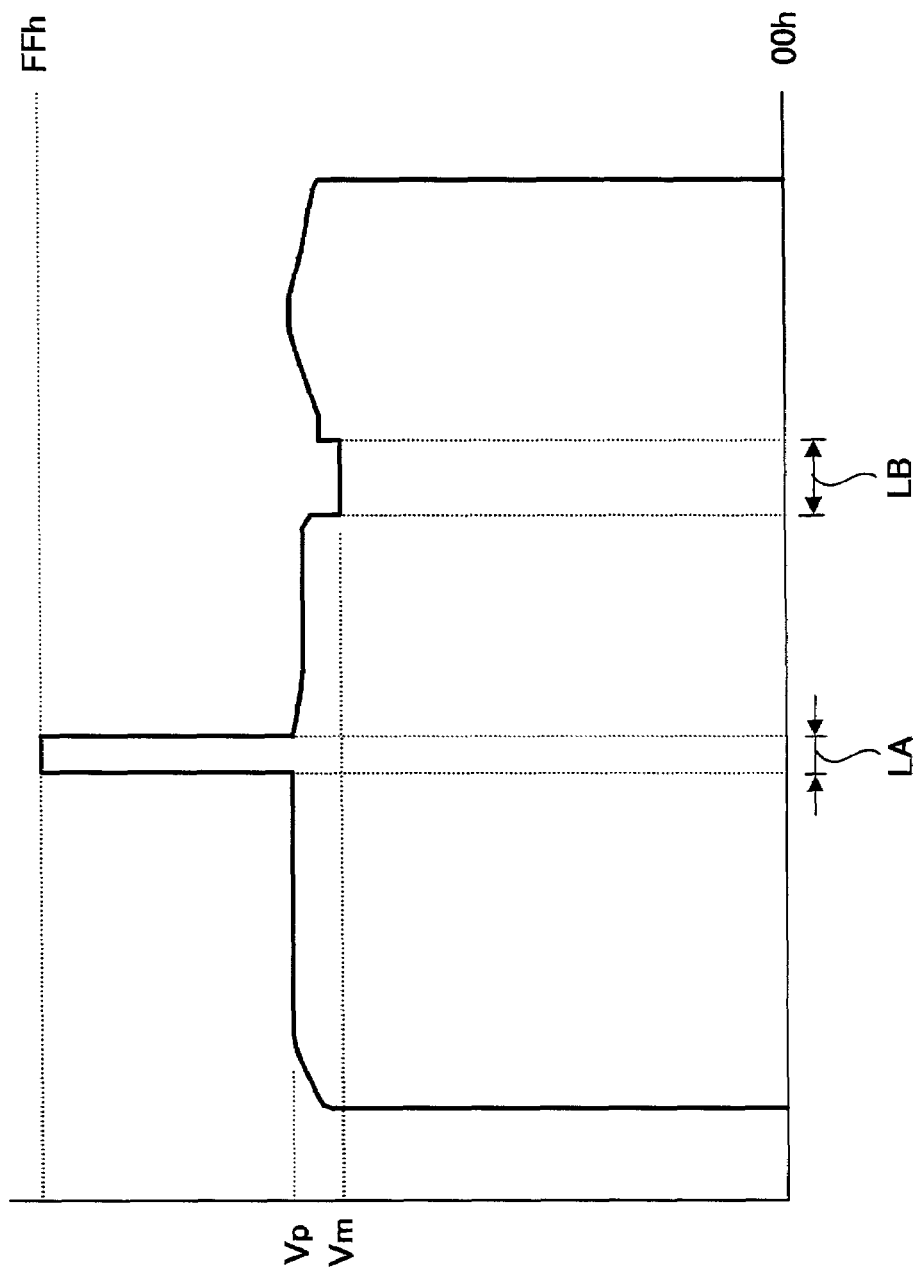
FIG. 6 is a diagram illustrating an example of standard shading data after two levels of correction are performed.
Figure 7:
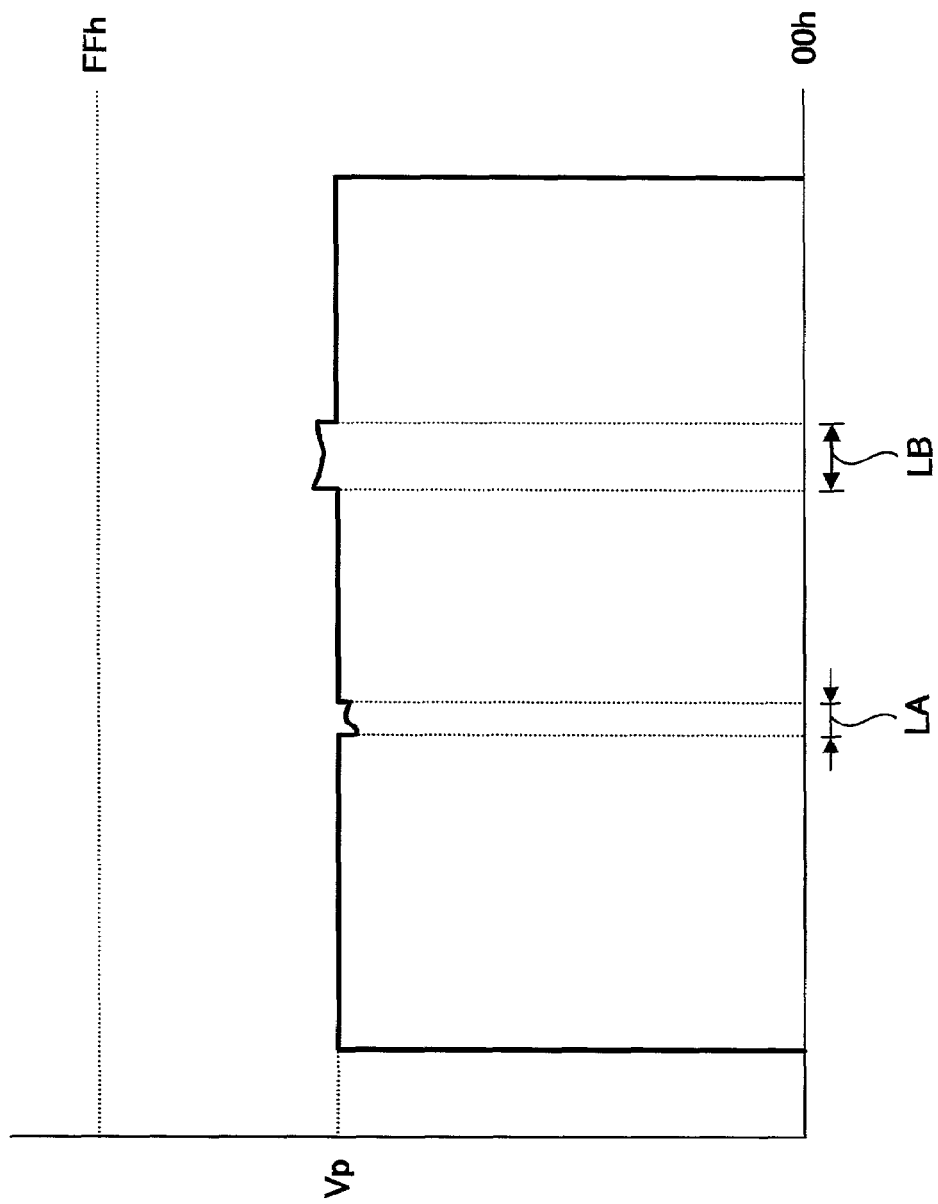
FIG. 7 is a diagram illustrating an example of a digital image signal IDc output by a shading correction section SC in an original document reading mode.
Figure 8:
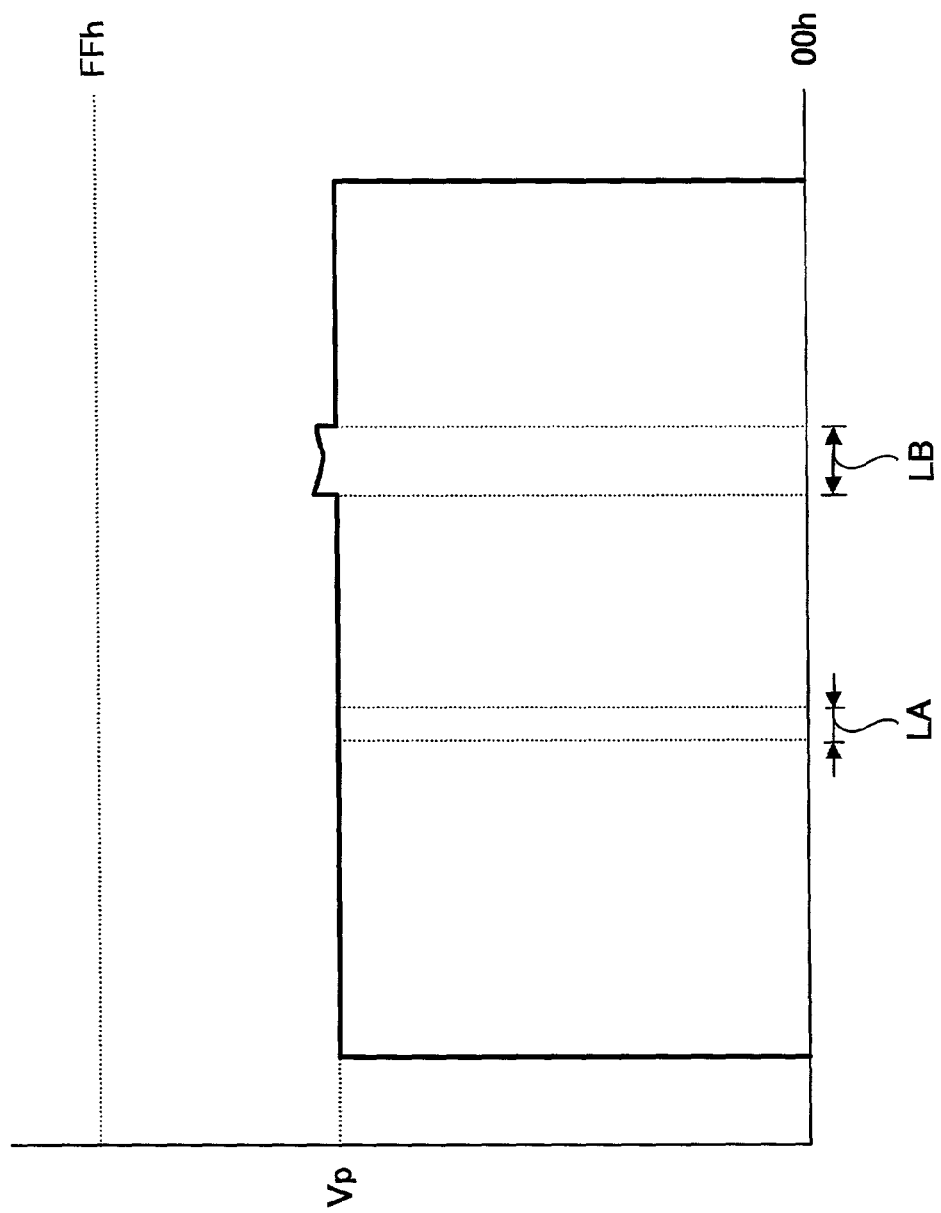
FIG. 8 is a diagram illustrating an example of a digital image signal IDd.
Figure 9:
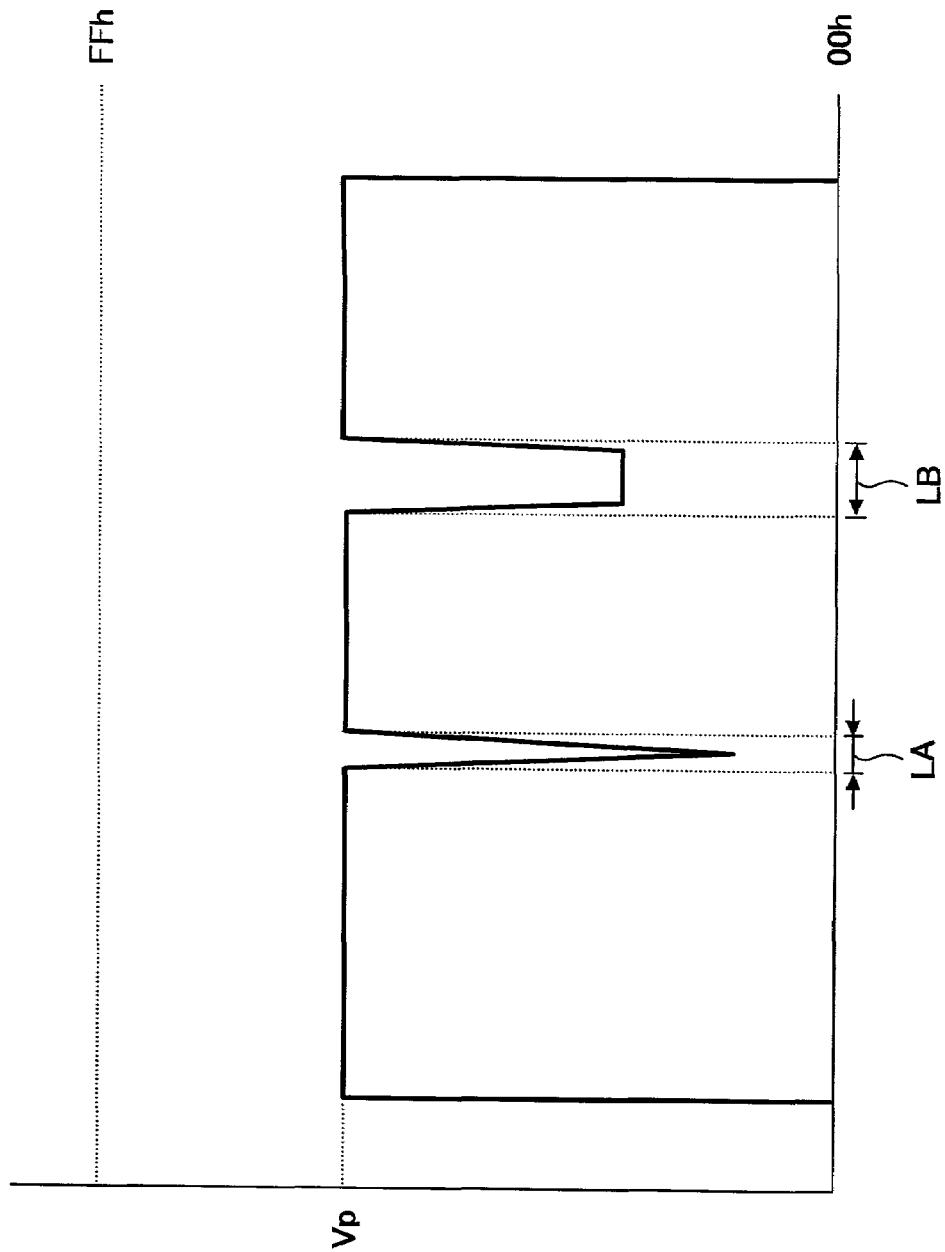
FIG. 9 is a diagram illustrating another example of the digital image signal IDc output by the shading correction section SC in the original document reading mode.
Figure 10:
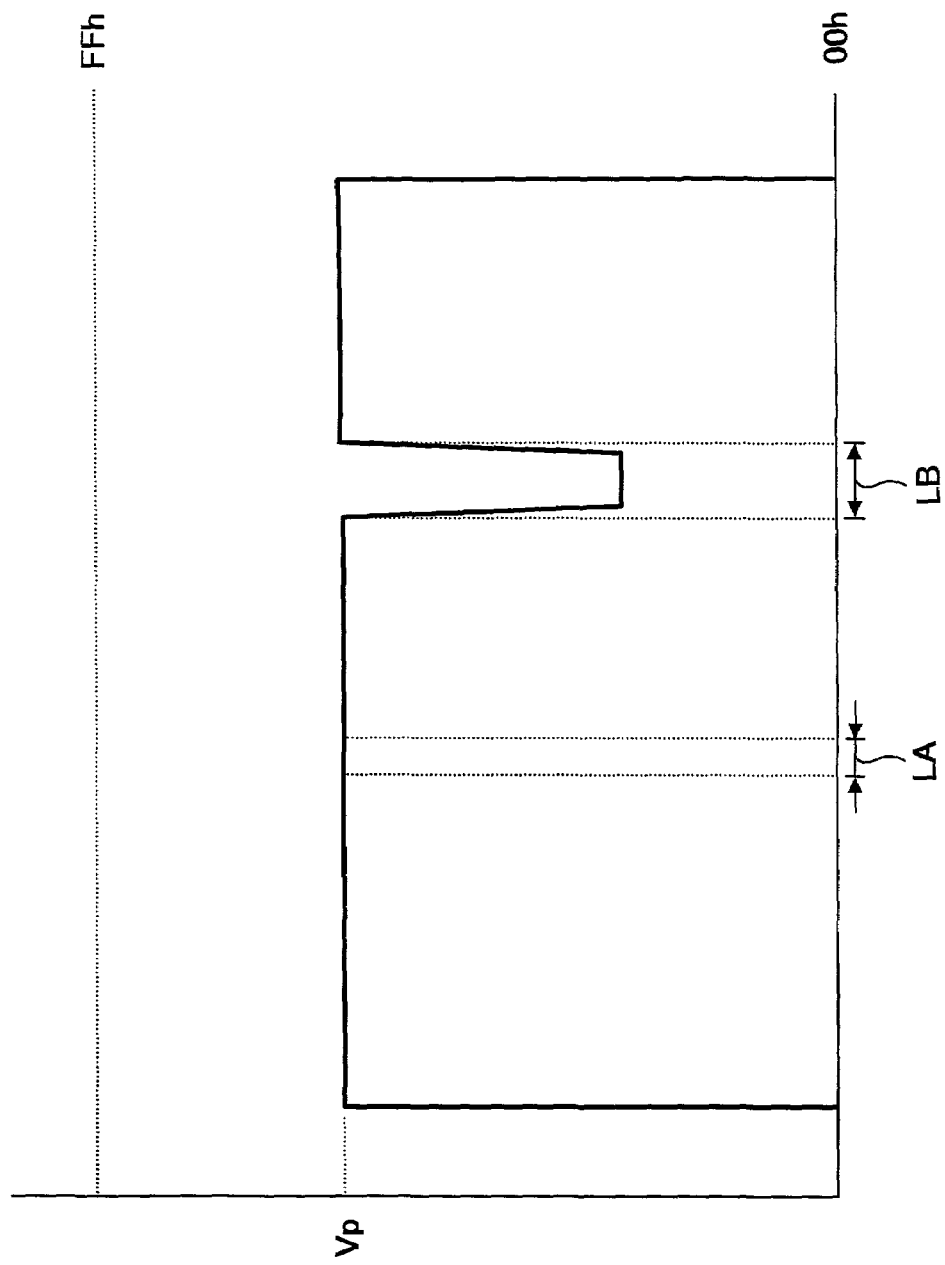
FIG. 10 is a diagram illustrating another example of the digital image signal IDd.

FIG. 7 illustrates shading-corrected documents image data that has been subjected to a shading correction based on white image data corrected as in FIG. 6 in which the document image data was derived when fouling such as G1 was present but not fouling such as G2. FIG. 8 illustrates the document image data of FIG. 7 that has been further corrected by replacing the pixel values in region LA with the value of a normal pixel (or pixels) nearby, for example one or more pixel values derived just before the values of region LA are derived. FIG. 9 illustrates document image data derived when fouling such as G2 is present at two locations, producing decreased signal at regions LA and LB. Last, FIG. 10 illustrates the document image data of FIG. 9 after correction in which the pixel values in region LA were replaced with nearby normal data and the pixel values in region LB (which exceeds a certain size) were replaced with shading-corrected document image data derived by using shading data such as in region LB in FIG. 6.

Referring now to FIG. 2, an analog image signal IA is output from the line image sensor SS for each pixel along of a main scanning direction at every one line reading cycle. The analog image signal 1A is converted into a digital image signal ID of a predetermined number of bits per pixel (for example, 8 bits). The converted digital image signal ID is transmitted to a darkness level correction section BC.

The darkness level correction section BC corrects for a value of a darkness level of the input digital image signal ID based on data which is stored in a memory BM. A corrected digital image signal IDb is then transmitted to a shading correction section SC. For example, the digital image signal ID, corresponding to a dark current which is obtained by activating the image sensor SS before the linear light source LT lights up, may be used as the data to be stored in the memory BM.

The shading correction section SC stores the data of one line of the transmitted digital image signal IDb in a memory WM when obtaining standard white image data (hereinafter to be referred to as standard shading data). The shading correction section SC performs a shading correction on one line of the transmitted digital image signal IDb using the standard shading data stored in the memory WM when reading the original document DK. A digital image signal IDc of the original document DK, on which the shading correction has been performed, is then transmitted to an abnormal pixel correction section BD.

For example, the shading correction section SC performs a computation using a below-described expression (1).

$$Vo(n) = Vi(n) \times Vp/Vs(n) \quad (I).$$

Vo (n) is a shading correction result of pixel "n" of original document image data, and Vi (n) is the digital image signal IDb of same pixel "n" of original document image data before the shading correction is performed. Vp is a peak value of shading correction data, and Vs(n) is shading correction data of the same pixel position "n" from memory WM.

An abnormal pixel detection section BB detects an abnormal pixel in pixels read by the line image sensor SS based on standard shading data which is stored in the memory WM by the shading correction section SC. A value of the standard shading data is replaced with all white value (FFh) or all black value (OOh) for the pixel detected as abnormal.

When the number of successive abnormal pixels exceeds the number that can be corrected by the abnormal pixel correction section BD (i.e., allowable correction number), the standard shading data of the abnormal pixels, which is stored in the memory WM, is replaced with a value obtained by multiplying a peak value of the standard shading data by a predetermined value (for example, "0.9"). When reading an image of the original document DK, abnormal pixels thereof are detected based on the standard shading data stored in the memory WM. The detection of the abnormal pixels is reported to the shading correction section SC. The detection of the abnormal pixel is then reported to the abnormal pixel correction section BD from the shading correction section SC.

In reading an image of the original document DK, the abnormal pixel correction section BD outputs the digital image signal IDc, which is transmitted by the shading correction section SC, to a peak tracking section PK as a digital image signal IDd. At the same time, the abnormal pixel correction section BD outputs a value of a pixel, immediately preceding an abnormal pixel (i.e., pixel which is not reported as abnormal), to the peak tracking section PK as a digital image signal IDd.

The peak tracking section PK corrects the value of the digital image signal IDd so that a peak value of the transmitted digital image signal IDd matches an appropriate maximum value in the data being output from section PK. If the background of the original document is not white (e.g., a newspaper clipping), section PK can make the background of the image data IDs conform to a selected white value, such that the data IDs can be printed with an actual white background. To this end, the section PK can keep track of the peak value of the image data IDd provided at its input and normalize that peak value to actual white to make the background of the output data IDs white rather than the grayish tone of a typical newspaper clipping. Of course, the PK process can be applied to original documents other than newspaper clippings such as, without limitation, recycled paper in which the background is not white. The output data from section PK is supplied to a device of a next step as read image data IDs.

Figure 3:
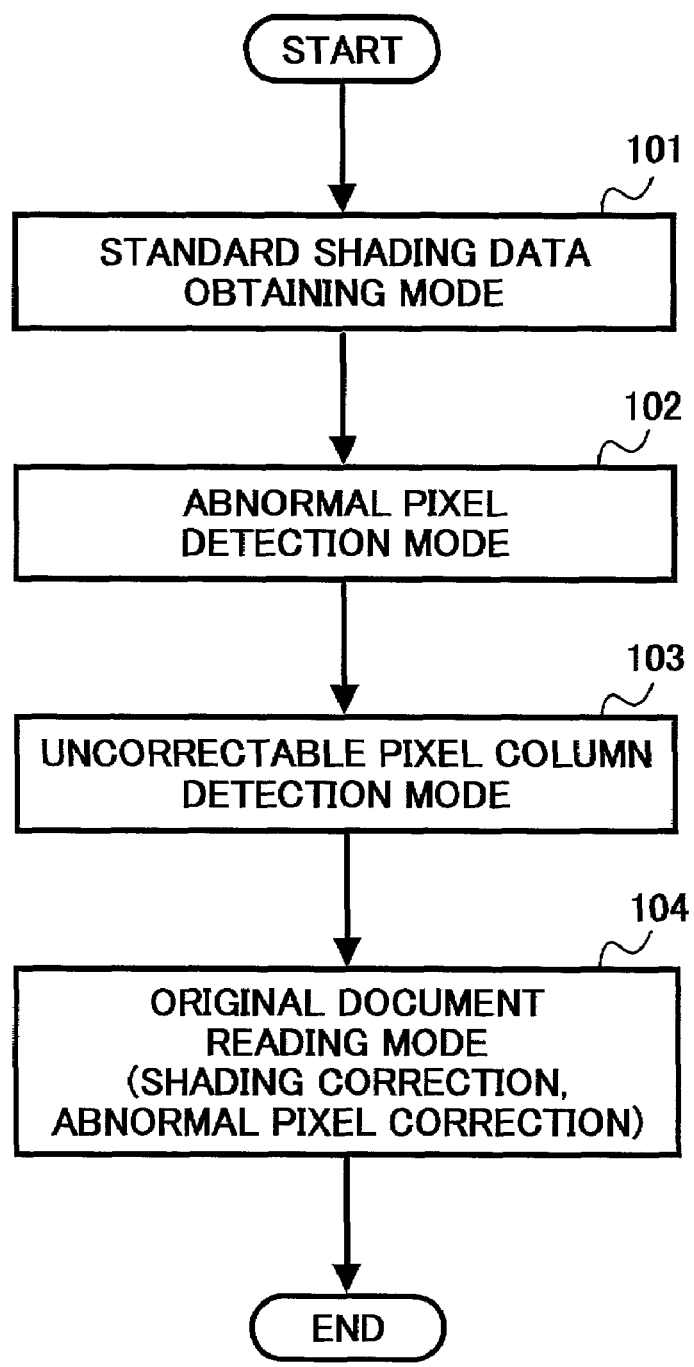
FIG. 3 is a flowchart illustrating a reading operation of an image of an original document in the image reading apparatus.

An image reading operation of an original document in the image reading apparatus includes four steps as illustrated in FIG. 3. That is, a standard shading data obtaining mode (step 101), an abnormal pixel detection mode (steps 102), an uncorrectable pixel column detection mode (step 103), and an original document reading mode (step 104).

In the standard shading data obtaining mode, an image of the white plate WT (i.e., standard white image) is read before the original document DK is fed. The shading correction section SC stores the digital image signal IDb, which is output by the darkness level correction section BC, in the memory WM as standard shading data.

As illustrated in FIG. 4, the standard shading data falls toward an all black level in continuous pixel regions LA and LB, which correspond to a size of fouling, at a position where fouling adheres at an image reading line.

In the abnormal pixel detection mode, the abnormal pixel detection section is BB examines the standard shading data stored in the memory WM by a commonly known method to detect abnormal pixels. The value of the standard shading data of the abnormal pixels is replaced with the all white value (FFh) or the all black value (00h).

For example, when standard shading data of an abnormal pixel is replaced with the all white value by the abnormal pixel detection section BB, the standard shading data illustrated in FIG. 4 is changed to the all white value (FFh) in the continuous pixel regions LA and LB as illustrated in FIG. 5.

In the uncorrectable pixel column detection mode, the abnormal pixel detection section BB examines standard shading data which is stored in the memory WM. A value obtained by multiplying a peak value of the standard shading standard data at that time by 0.9 is stored as the shading standard data of the continuous pixel region, when the continuous number of a pixel having a value of FFh exceeds an allowable correction number.

For example, standard shading data is changed as shown in FIG. 6 (to FFh) when a continuous pixel number in the continuous pixel region LA is not larger than an allowable number. However, in this example a continuous pixel number in the continuous pixel region LB exceeds the allowable correction number. Herein, Vp is a peak value of the standard shading data, and Vm is a value obtained by multiplying Vp by 0.9, so the data for LB is changed to Vm=0.9 Vp.

In the original document reading mode, the shading correction section SC outputs the digital image signal IDc as shown in FIG. 7 when an all white region was read with the fouling G1 in FIG. 1, which is hidden by the original document DK, adheres to an optical system. In this case, a value of the digital image signal IDc is smaller than a peak value Vp of the shading correction data in the continuous pixel region LA because the all white value FFh was applied as the shading correction data.

In the original document reading mode, the value of the digital image signal IDc for the region that corresponds in position to region LB in FIG. 6 is approximately 1.1 times larger than image reading data because the value obtained by multiplying the peak value VP of the shading correction data by 0.9 was applied as the shading correction data.

The abnormal pixel detection section BB reports a pixel of the original document data, for which the value of the shading correction data was converted to the all white value FFh, to the shading correction section SC as an abnormal pixel. The shading correction section SC then reports the detection of the abnormal pixel to the abnormal pixel correction section BD.

The detection of the original document data corresponding to abnormal pixels in the continuous pixel region LA is reported to the abnormal pixel correction section BD via the shading correction section SC. There, a pixel value of the digital image signal IDd of original document data, which is output by the abnormal pixel correction section BD, is corrected by applying a value of the immediately preceding normal pixel of original document data in the continuous pixel region LA as shown in FIG. 8.

In the original document reading mode, the shading correction section SC outputs the digital image signal IDc as shown in FIG. 9 when the all white region was read with the fouling G2 in FIG. 1, which is not hidden by the original document DK, adheres to the optical system.

A detection of abnormal pixels in the continuous pixel region LA is reported to the abnormal pixel correction section BD via the shading correction section SC. A pixel value of the digital image signal IDd, which is output by the abnormal pixel correction section BD, is corrected by applying a value of the immediately preceding normal pixel of shading-corrected original document data in the continuous pixel region LA as shown in FIG. 10.

In the continuous pixel region LB, whose length exceed the allowable correction number of pixels, a decline of the digital image signal IDd of shading-corrected original document data is improved by approximately 10%, as seen in FIG. 10, because standard shading data, which is obtained by multiplying Vp by 0.9, is applied.

Figure 11:
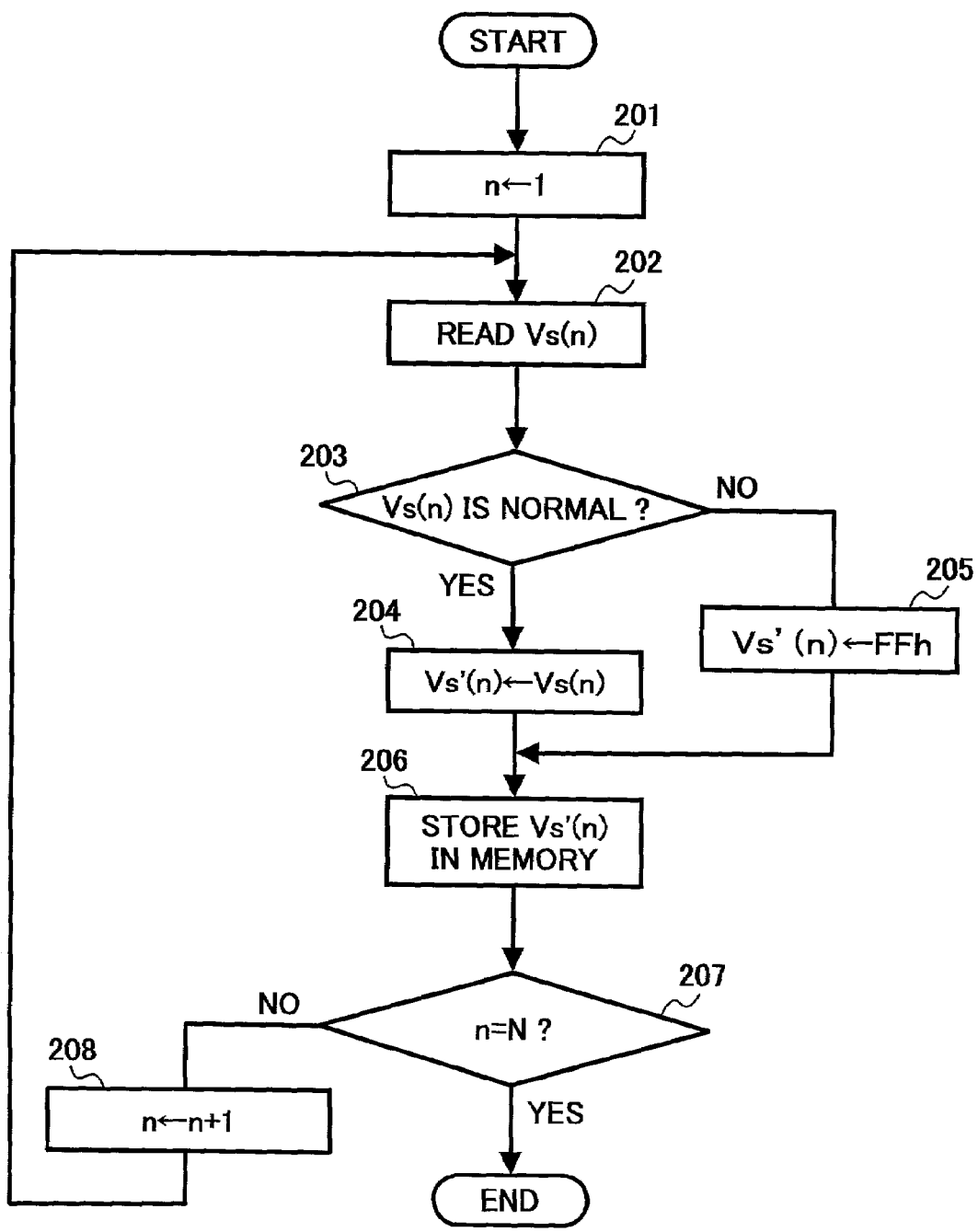
FIG. 11 is a flowchart illustrating an example of process performed by an abnormal pixel correction section BD in an abnormal pixel detection mode.

FIG. 11 is a flowchart illustrating an example of process performed by the abnormal pixel correction section BD in the abnormal pixel detection mode (i.e., step 102).

Firstly, "1" is assigned to a variable "n" to memorize a position of a pixel to be processed at step 201. The shading correction data of the pixel "n", Vs (n), is read from the memory WM at step 202.

Whether or not a value Vs (n) of the read shading correction data of the pixel "n" is normal is determined at step 203. When the answer is "Yes" at step 203, the value of the shading correction data Vs (n) is set as a variable Vs'(n) at step 204. When the answer is "No" at step 203, the all white value (FFh) is set as the variable Vs'(n) at step 205.

The value of the variable Vs'(n) is then stored in the memory WM at step 206 as the shading correction data of the pixel "n". Step 207 tests whether or not a value of the counter "n" is equal to a total number of pixels N. When the answer is "No" at step 207, the value of the variable "n" is increased by "1" at step 208. The process then returns to the step 202 to perform the same process on the following pixel. When the answer is "Yes" at step 207, the process is finished.

Figure 12:
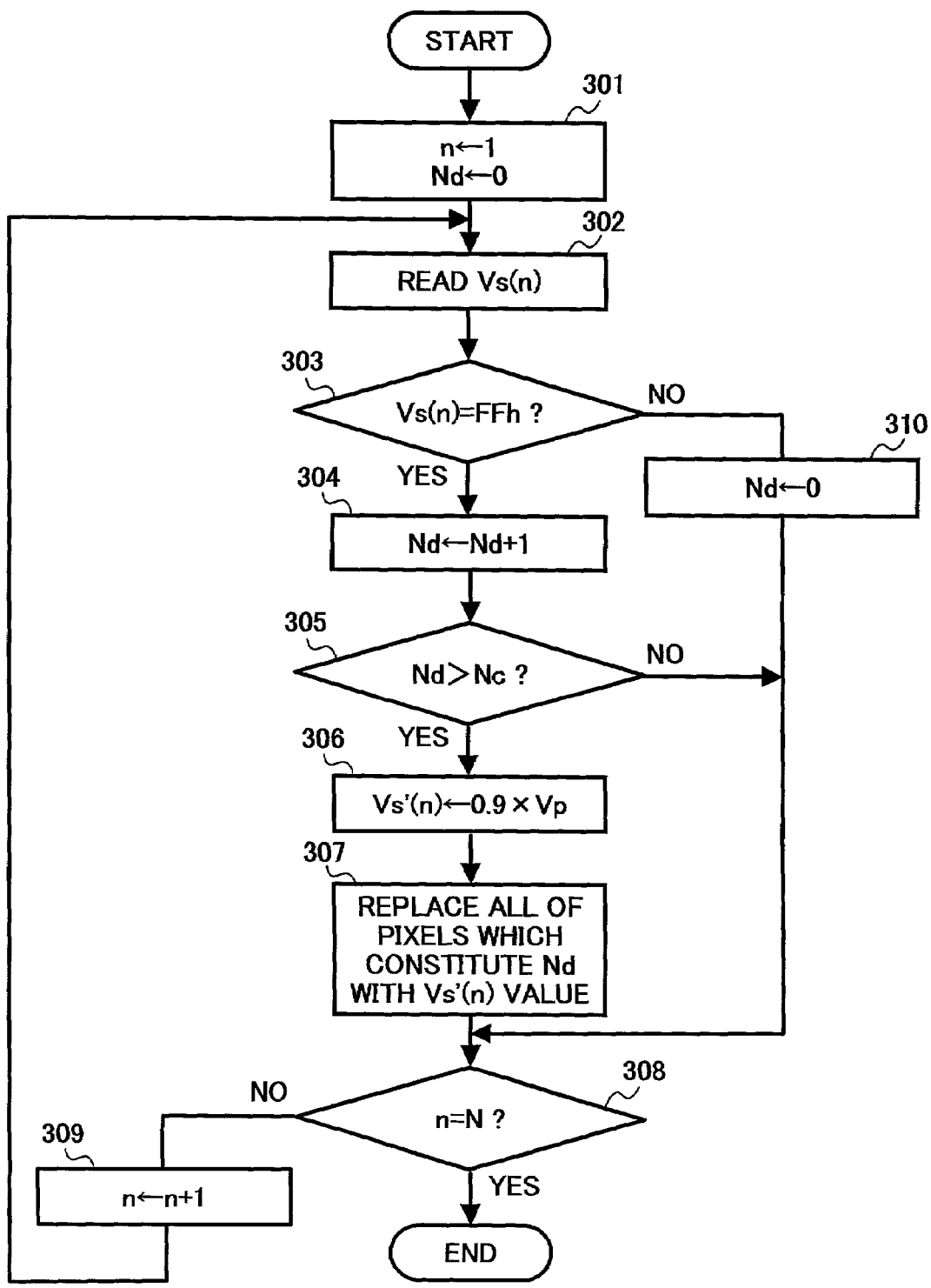
FIG. 12 is a flowchart illustrating an example of process performed by the abnormal pixel correction section BD in an uncorrectable pixel column detection mode.

FIG. 12 is a flowchart illustrating an example of process performed by the abnormal pixel correction section BD in the uncorrectable pixel column detection mode (i.e., step 103).

"1" is assigned to the variable "n" to memorize a position of a pixel to be processed, and "0" is assigned to the variable "Nd" to memorize a continuous number of abnormal pixels at step 301. The shading correction data Vs (n) of the pixel "n" is read from the memory WM at step 302.

Step 303 checks whether or not a value VS (n) of the read shading correction data of the pixel "n" is equal to the all white value (FFh). When the answer is "Yes" at step 303, the pixel is judged to be abnormal. The value of the variable "Nd" is then increased by "1" at step 304, and step 305 checks whether or not a value of the variable "Nd" now is larger than an allowable correction number "Nc".

When the answer is "Yes" at step 305, a value obtained by multiplying the peak value of the shading correction data Vp by 0.9 is set at the variable Vs'(n) at step 306. The shading correction data for all of the pixels, which constitute the variable "Nd" including the pixel of the "n" number, is replaced with the value of the variable Vs'(n) at step 307.

Step 308 checks whether or not a value of the counter "n" is equal to the total number of pixels "N" at step 308. When the answer is "No" at step 308, the value of the variable "n" is increased by "1" at step 309. The process then returns to the step 302 to perform the same process on the following pixel. When the answer is "Yes" at step 308, the process is finished.

When the answer is "No" at step 305, the process proceeds to step 308.

When the answer is "No" at step 303, the value of the variable "Nd" is initialized with "0" at step 310. The process then proceeds to step 308.

As described above, according to an example of a preferred embodiment, a value for an abnormal pixel is set as a standard shading data for a pixel which requires a pixel correction computation. The value for the abnormal pixel is set in a process of the abnormal pixel correction section BD that is performed in a stage prior to the original document reading mode. A value corresponding to a peak value of standard shading data (i.e., a value obtained by multiplying the peak value by 0.9 according to an example of a preferred embodiment) is set as the standard shading data for a pixel in a region where the pixel cannot be corrected, namely, in a region where the number of successive abnormal pixels exceeds an allowable correction number.

Therefore, costs of an image reading apparatus can be reduced because special memory device for memorizing a position of an abnormal pixel is not required.

In the above-described example, the all white value (FFh) is applied as a value which shows an abnormal pixel, however, the all black value (OOh) may be applied in place of the all white value (Ffh).

Further, the number of bits digital image signal is 8-bit in the above-described example, however, a digital image signal of more than 8-bit may be applied.

According to the above-described example, a line image sensor is used to convert an image of an original document into an electric image signal, however, a photoelectric conversion element other than the line image sensor may be employed to the present invention.

Numerous additional modifications and variations are possible in light of the above teachings. It is therefore to be understood that within the scope of the appended claims, the present invention may be practiced otherwise than as specifically described herein.

This patent application is based on and claims priority of Japanese Patent Application No. 2000-347726, filed on Nov. 15, 2000, the entire contents of which are hereby incorporated by reference.

What is claimed as new and is desired to be secured by Letters Patent of the United States is:

1. An image reading apparatus, comprising:
   an image sensor configured to rend an image of an original document to generate read image data;
   a shading correction device configured to perform a shading correction on said read image data; and
   an abnormal white image pixel detection device configured to examine a value of standard white image data on a pixel-by-pixel basis to determine whether or not pixels are abnormal,
   wherein the standard white image data is acquired by reading a white image which is a standard for a shading correction,
   wherein before the image of the original document is read, a predetermined value corresponding to a peak value of the standard white image data is set as a standard white image data for a pixel that is determined to be abnormal by said abnormal white image pixel detection device.

2. An image reading apparatus, comprising:
   an image sensor configured to read an image of an original document to generate read image data;
   a shading correction device configured to perform a shading correction on said read image data;
   an abnormal white image pixel detection device configured to examine a value of standard white image data on a pixel-by-pixel basis so as to determine whether or not pixels are abnormal, wherein the standard white image data is acquired by reading a white image which is a standard for a shading correction;
   an image data correction device configured to correct a value of continuous pixels, which is determined to be abnormal when the image of the original document is read, based on a value of a normal pixel around the continuous abnormal pixels on which the shading correction is performed, when the number of the continuous abnormal pixels is within a predetermined allowable number,
   wherein a previously specified value is stored for use as the standard white image data for pixels that arc determined to be abnormal by said abnormal white image pixel detection device, and wherein the value of the standard white image data for all of pixels in a region in which the number of the pixels which are determined to be abnormal and for which the previously specified value is stored exceeds the predetermined allowable number, is replaced with a predetermined value.

3. The image reading apparatus according to claim 2, wherein the predetermined value is obtained by multiplying a peak value of the standard white image data by a previously determined value of less than 1.

4. The image reading apparatus according to claim 2, wherein the previously specified value is one of an upper limit and a lower limit of the standard white image data.

5. An image reading apparatus, comprising:
an image sensor configured to read an image of an original document to generate read image data;
a shading correction device configured to perform a shading correction on said read image data; and
an abnormal white image pixel detection device configured to examine a value of standard white image data on a pixel-by-pixel basis to determine whether or not pixels are abnormal, wherein the standard white image data is acquired by rending a white image which is a standard for a shading correction,
wherein a previously specified value is stored for use as the standard white image data for the pixels that are determined to be abnormal by said abnormal white image pixel detection device, and
wherein the previously specified value is one of a upper limit and a lower limit of the standard white image data.

6. An image reading method, comprising:
acquiring standard white image data by reading a white image;
determining whether or not the standard white image data is abnormal by examining the standard white image data on a pixel-by-pixel basis; and
before the image or the original document is read, setting a predetermined value corresponding to a peak value of The standard white image data as a standard white image data for a pixel that is determined to be abnormal.

7. An image reading method, comprising:
acquiring standard white image data by reading a white image;
determining whether or not the standard white image data is abnormal by examining the standard white image data on a pixel-by-pixel basis;
correcting a value of a first region of pixels, which is determined to be abnormal when an image of an original document is read, based on a value of a normal pixel around the first region on which a shading correction has been performed, when the number of pixels in said first region is within a predetermined allowable number;
replacing the value of the standard white image data for the pixels in a second region, in which the number of pixels stored with the previously specified value exceeds the predetermined allowable number, with a predetermined value.

8. An image reading apparatus, comprising:
an image sensor means for reading an image of an original document to generate read image date;
a shading correction means for performing a shading correction on the read image data; and
an abnormal white image pixel detection means for examining a value of standard white image data on a pixel-by-pixel basis to determine whether or not pixels are abnormal, wherein the standard white image data is acquired by reading a white image which is a standard for a shading correction,
wherein before the image of the original document is read, a predetermined value corresponding to a peak value of the standard white image data is set as a standard white image data for a pixel that is determined to be abnormal by said abnormal white image pixel detection means.

9. An image reading apparatus, comprising:
an image sensor means for reading an image of an original document to generate read image data;
a shading correction means for performing a shading correction on the read image data;
an abnormal white image pixel dejection means for examining a value of standard white image data on a pixel-by-pixel basis to determine whether or not pixels are abnormal, wherein the standard white image data is acquired by reading a white image which is a standard for a shading correction;
an image data correction means for correcting a value of continuous pixels, which is determined to be abnormal when the image of the original document is read, based on a value of a normal pixel around the continuous abnormal pixels on which the shading correction is performed, when the number of the continuous abnormal pixels is within a predetermined allowable number, and
wherein a previously specified value is stored for use as the standard white image data for pixels that are determined to be abnormal by said abnormal white image pixel detection means, and wherein the value of the standard white image data for all of pixels in a region in which the number of the pixels which are determined to be abnormal and for which with the previously specified value is stored exceeds the predetermined allowable number, is replaced with a predetermined value.

10. The image reading apparatus according to claim 9, wherein the predetermined value is obtained by multiplying a peak value of the standard white image data by a previously determined value of less than 1.

11. The image reading apparatus according to claim 9, wherein the previously specified value is one of an upper limit and a lower limit of to standard white image data.

12. An image reading apparatus, comprising:
an image sensor means for reading an image of an original document to generate read image data;
a shading correction means for performing a shading correction on the read image data;
an abnormal white image pixel detection means for examining a value of standard white image data on a pixel-by-pixel basis to determine whether or not pixels are abnormal, wherein the standard white image data is acquired by reading a white image which is a standard for a shading correction;
an image data correction means for correcting a value of continuous pixels, which is determined to be abnormal when the image of the original document is read, based on a value of a normal pixel around the continuous abnormal pixels on which the shading correction is performed, when the number of the continuous abnormal pixels is within a predetermined allowable number, and
wherein a previously specified value is stored for use as the standard white image data for pixels that are determined to be abnormal by said abnormal white image pixel detection means, and wherein the value of the standard white image data for all of pixels in a region in which the number of the pixels which are determined to be abnormal and for which with the previously specified value is stored exceeds the predetermined allowable number, is replaced with a predetermined value, and
wherein the previously specified value is one of an upper limit and a lower limit of the standard white image data.

13. A computer readable medium tangibly embodying a computer program of instructions executable by a computer to perform the steps recited in claim 6.

14. A computer readable medium tangibly embodying a computer program of instructions executable by a computer to perform the steps recited in claim 7.

15. An image reading method comprising:
- reading a white plate to generate white image data comprising white pixel values for respective pixel positions;
- examining the white image data to detect abnormal white pixel values;
- replacing white pixel values detected as abnormal in the examining step with replacement pixel values to thereby generate shading correction data having at least one region of replacement pixel values;
- reading a document to generate document image data comprising document pixel values for respective pixel positions related to said pixel positions of the white image data;
- identifying pixel positions of abnormal document pixel values in said document image data;
- performing a shading correction on said document image data to replace document pixel values with corrected document pixel values derived through a process chat involves using at least said shading correction data and said document image data, to thereby generate corrected document image data; and
- providing said corrected original image data as an output.

16. A method as in claim 15 in which the step of replacing white pixel values comprises using first replacement values set at one of an upper limit and a lower limit of pixel values in said white image data.

17. A method as in claim 16 in which the step of replacing white pixel values further comprises selectively using second replacement values derived by weighting respective white pixel values with weighting factors of less than unity.

18. A method as in claim 17 comprising using said first replacement values for abnormal white pixel in a region within a first size and using said second replacement values for abnormal white pixels values in a region exceeding said first size.

19. A method as in claim 18 in which said shading correction further comprises replacing selected abnormal document pixel values with document pixel values near a region of the selected abnormal document pixel values.

20. A computer readable medium tangibly embodying a computer program of instructions executable by a computer to perform the steps of claim 19.

21. A computer readable medium tangibly embodying a computer program of instructions executable by a computer to perform the steps of claim 18.

22. A computer readable medium tangibly embodying a computer program of instructions executable by a computer to perform the steps of claim 17.

23. A computer readable medium tangibly embodying a computer program of instructions executable by a computer to perform the steps of claim 16.

24. An image reading apparatus comprising:
- a reading and digitizing station scanning a white plate to generate white image data comprising white pixel values for respective pixel positions, and scanning a document to generate document image data comprising document pixel values for respective pixel positions related to said pixel positions of the white image data;
- an abnormal pixel detecting circuit coupled to said reading and digitizing station to receive therefrom said white pixel values and identify abnormal white pixel values;
- a shading correction circuit coupled to said reading and digitizing station and said abnormal pixel detection circuit to replace white pixel values identified as abnormal with replacement pixel values to thereby generate shading correction data having at least one region of replacement pixel values, and to use said shading correction data to carry out shading correction of document pixel values to thereby produce shading-corrected document pixel data;
- an abnormal pixel correction circuit coupled to the shading correction circuit to identity abnormal pixel values in said document image data and replace selected abnormal pixel values in said shading-corrected document image data with document pixel values not identified as abnormal by the abnormal pixel value correction circuit.

25. An image reading apparatus as in claim 24 in witch said abnormal pixel value correction circuit comprises a system for identifying as selected abnormal pixel values only pixel values for pixels in a region of said document image data below a selected size.

* * * * *